United States Patent
Self et al.

(10) Patent No.: US 10,051,119 B2
(45) Date of Patent: Aug. 14, 2018

(54) CALLER LOCATION DETERMINATION SYSTEMS AND METHODS

(71) Applicant: Laaser Critical Communications Corp., Atlanta, GA (US)

(72) Inventors: Michael R. Self, Ft. Lauderdale, FL (US); Frederick L. White, Atlanta, GA (US); Raymond J. Penn, Davie, FL (US); Jonathan A. Harmer, Dunwoody, GA (US); William R. Whitehurst, Athens, AL (US)

(73) Assignee: Laaser Critical Communications, Corp., Atlanta, GA (US)

( * ) Notice: Subject to any disclaimer, the term of this patent is extended or adjusted under 35 U.S.C. 154(b) by 0 days.

(21) Appl. No.: 15/719,341

(22) Filed: Sep. 28, 2017

(65) Prior Publication Data

US 2018/0020091 A1    Jan. 18, 2018

Related U.S. Application Data

(63) Continuation-in-part of application No. 15/424,430, filed on Feb. 3, 2017, now Pat. No. 9,807,581, which
(Continued)

(51) Int. Cl.
*H04M 3/42* (2006.01)
*H04W 4/22* (2009.01)
(Continued)

(52) U.S. Cl.
CPC ........ *H04M 3/42357* (2013.01); *H04L 51/20* (2013.01); *H04M 1/72541* (2013.01);
(Continued)

(58) Field of Classification Search
CPC ....... H04W 4/22; H04W 4/023; H04W 64/00; H04W 4/02; G08B 25/016
(Continued)

(56) References Cited

U.S. PATENT DOCUMENTS 5,161,180 A     11/1992  Chavous
5,598,460 A *   1/1997  Tendler .................. H04M 11/04
                                                      379/37
(Continued)

OTHER PUBLICATIONS

International Search Report, dated Dec. 14, 2017, from corresponding International Application No. PCT/US2017/054402.
(Continued)

*Primary Examiner* — Cong Tran
(74) *Attorney, Agent, or Firm* — Brient IP Law, LLC

(57) ABSTRACT

Telecommunications systems that are adapted to: (1) monitor a user's behavior to anticipate that the user will likely imminently place an emergency services request; and (2) in response to determining that a request for emergency services is likely to be initiated imminently, facilitate the transmission of telemetry data from the user's mobile computing device to a remote computer for use in determining a dispatchable location for use by a PSAP that will handle the request. The system may execute these steps in advance of the request for emergency services being initiated. For example, the system may monitor the user's behavior, and determine that the user will imminently place an emergency call in response to determining that the user has dialed one or more digits of an emergency number, but has not yet selected a "send" key (or the equivalent) to formally initiate the call.

21 Claims, 12 Drawing Sheets

Related U.S. Application Data is a continuation-in-part of application No. 15/392,256, filed on Dec. 28, 2016, now Pat. No. 9,693,213, which is a continuation-in-part of application No. 15/218,973, filed on Jul. 25, 2016, now Pat. No. 9,544,750, which is a continuation-in-part of application No. 14/939,702, filed on Nov. 12, 2015, now Pat. No. 9,402,159.

(60) Provisional application No. 62/402,806, filed on Sep. 30, 2016.

(51) Int. Cl.
*H04M 1/725* (2006.01)
*H04L 12/58* (2006.01)
*H04M 3/51* (2006.01)
*H04W 4/90* (2018.01)

(52) U.S. Cl.
CPC ........... *H04M 3/5116* (2013.01); *H04W 4/22* (2013.01); *H04W 4/90* (2018.02); *H04M 2242/04* (2013.01); *H04M 2242/14* (2013.01); *H04M 2242/30* (2013.01)

(58) Field of Classification Search
USPC ... 455/404.1, 404.2, 456.1, 456.3, 457, 567; 340/436, 903, 988
See application file for complete search history.

(56) References Cited

U.S. PATENT DOCUMENTS

| | | | |
|---|---|---|---|
| 5,742,666 A * | 4/1998 | Alpert | H04M 1/274575 340/426.2 |
| 6,225,944 B1 | 5/2001 | Hayes | |
| 6,477,363 B1 | 11/2002 | Ayoub et al. | |
| 7,796,738 B2 | 9/2010 | Wright | |
| 7,826,598 B1 | 11/2010 | Prozeniuk et al. | |
| 8,064,875 B2 | 11/2011 | Velazquez et al. | |
| 8,098,798 B2 | 1/2012 | Goldman et al. | |
| 8,364,117 B2 | 1/2013 | Hawkins | |
| 8,442,483 B2 | 5/2013 | Gunasekara | |
| 8,755,767 B2 | 6/2014 | Maier et al. | |
| 8,903,355 B2 | 12/2014 | Biage et al. | |
| 8,994,591 B2 | 3/2015 | Dupray et al. | |
| 9,014,661 B2 | 4/2015 | Decharms | |
| 9,088,871 B2 | 7/2015 | Park et al. | |
| 9,131,361 B2 | 9/2015 | Ray | |
| 9,300,784 B2 | 3/2016 | Roberts et al. | |
| 9,363,373 B2 | 6/2016 | Abnett et al. | |
| 9,402,159 B1 | 7/2016 | Self et al. | |
| 9,457,754 B1 * | 10/2016 | Christensen | B60Q 1/525 |
| 9,582,985 B2 | 2/2017 | Shurtz | |
| 2005/0169248 A1 | 8/2005 | Truesdale et al. | |
| 2006/0293024 A1 | 12/2006 | Benco et al. | |
| 2008/0153455 A1 | 6/2008 | Lancaster | |
| 2011/0206036 A1 | 8/2011 | Deweese | |
| 2012/0088468 A1 | 4/2012 | Dickinson et al. | |
| 2012/0157795 A1 | 6/2012 | Chiu et al. | |
| 2012/0256769 A1 * | 10/2012 | Satpathy | G08B 13/19647 340/989 |
| 2012/0309340 A1 | 12/2012 | Ray | |
| 2013/0106594 A1 * | 5/2013 | Hiramatsu | H02J 7/34 340/436 |
| 2013/0267194 A1 | 10/2013 | Breed | |
| 2013/0331055 A1 | 12/2013 | McKown et al. | |
| 2014/0327540 A1 | 11/2014 | Shin et al. | |
| 2015/0382382 A1 * | 12/2015 | Nix | H04W 4/22 455/404.2 |

OTHER PUBLICATIONS

Written Opinion of the International Searching Authority, dated Dec. 14, 2017, from corresponding International Application No. PCT/US2017/054402.

International Search Report, dated Feb. 23, 2018, from corresponding International Application No. PCT/US2018/016694.

Written Opinion of the International Searching Authority, dated Feb. 23, 2018, from corresponding International Application No. PCT/US2018/016694.

International Search Report, dated Feb. 6, 2017, from corresponding International Application No. PCT/US2016/061410.

Notice of Allowance, dated Jul. 13, 2017, from corresponding U.S. Appl. No. 15/424,430.

Notice of Allowance, dated Jun. 15, 2016, from corresponding U.S. Appl. No. 14/939,702.

Notice of Allowance, dated May 2, 2017, from corresponding U.S. Appl. No. 15/392,256.

Notice of Allowance, dated Nov. 14, 2016, from corresponding U.S. Appl. No. 15/218,973.

Office Action, dated Apr. 18, 2017, from corresponding U.S. Appl. No. 15/424,430.

Office Action, dated Jan. 25, 2016 from corresponding U.S. Appl. No. 14/939,702.

Office Action, dated Mar. 29, 2017, from corresponding U.S. Appl. No. 15/392,256.

Office Action, dated Sep. 28, 2016, from corresponding U.S. Appl. No. 15/218,973.

Written Opinion of the International Searching Authority, dated Feb. 6, 2017, from corresponding International Application No. PCT/US2016/061410.

International Search Report, dated Feb. 1, 2018, from corresponding International Application No. PCT/US2017/068344.

Written Opinion of the International Searching Authority, dated Feb. 1, 2018, from corresponding International Application No. PCT/US2017/068344.

* cited by examiner

FIG. 5

Edit Location

Use the fields below to edit your location.

Ryan's House

2320 Marina Bay Drive E

Apt. 210

Fort Lauderdale

Florida

33312

SAVE LOCATION

FIG. 6

CALLER LOCATION DETERMINATION SYSTEMS AND METHODS

CROSS REFERENCE TO RELATED APPLICATION

This application claims priority from U.S. provisional patent application 62/402,806, filed Sep. 30, 2016, entitled "Caller Location Determination Systems and Methods", and is a continuation-in part of U.S. patent application Ser. No. 15/424,430, filed Feb. 3, 2017, entitled "Text Message Sender Location and PSAP Determination Systems and Methods", which claims priority from U.S. patent application Ser. No. 15/392,256, filed Dec. 28, 2016, entitled "Caller Location and PSAP Determination Systems and Methods", which claims priority from U.S. patent application Ser. No. 15/218,973, filed Jul. 25, 2016, entitled "Caller Location Determination Systems and Methods", which issued as U.S. Pat. No. 9,544,750 on Jan. 10, 2017 and which claims priority from U.S. patent application Ser. No. 14/939,702, filed Nov. 12, 2015, entitled "Caller Location Determination Systems and Methods," which issued as U.S. Pat. No. 9,402,159 on Jul. 26, 2016, all of which are hereby incorporated herein by reference in their entirety.

BACKGROUND

In the past, when an individual placed an emergency call (e.g., a "911" call), the individual did so via a landline that was associated with a particular physical location. Accordingly, if necessary, emergency service providers could determine the current location of the caller by simply identifying the phone number associated with the incoming call and then accessing the address associated with the phone number via, for example, a suitable database.

With the increase in popularity of alternative voice communications mediums such as cellular phones, voice-over-IP, voice-over-LTE and others, the percentage of emergency calls that are made using these communications mediums has increased dramatically. This has created a very large problem in that when an emergency service receives such a call, they cannot reliably determine the location of the caller based on the caller's phone number alone. Instead, emergency services typically ask the caller for their location before obtaining any additional information from the caller. If the caller is unable to speak or provide directions to their current location, the emergency service may, for example, try to obtain location information for the caller using triangulation techniques or other, often unreliable, location determination techniques. This often results in emergency service providers not being able to locate the caller in time to help them. This same issue applies to Voice-over-IP (VOIP) phones, which are portable and may be used in any location with a suitable Internet connection. There are presently a number of initiatives under way that seek to provide accurate dispatchable locations to Public Safety Answering Point (PSAPs) at the time of emergency calls, but all of the known proposed initiatives require substantial investments in new hardware and/or software on the part of network providers, mobile phone service providers, PSAPs or others.

Accordingly, there is a currently an urgent need for improved systems and methods that make use of existing technological infrastructures to identify the location of individuals making emergency calls, and other calls, via cellular phones, other portable communications devices (e.g., voice communications devices) and computing devices, while still being able to provide the Public Safety Answering Point (PSAP) with an accurate "dispatchable location" (a term well known in the art) to send first responder(s) to when such an emergency communication is placed.

SUMMARY

A computer-implemented method, according to various embodiments, of facilitating determining the location of an individual in the context of the individual using a mobile computing device to initiate a request for emergency services comprises: (1) receiving, by one or more computer processors, an indication that the individual has taken a set of one or more particular actions to begin a process of initiating a request for emergency services, but has not yet initiated a request for emergency services; (2) at least partially in response to receiving the indication, transmitting telemetry data from the mobile computing device to one or more computers that are remote from the mobile computing device for use in determining, by the one or more computers, the individual's current location; (3) receiving a request from the individual to place a request for emergency services; (4) at least partially in response to receiving the request: (A) facilitating a transmission of the individual's determined location to a data structure that the most appropriate public-safety answering point, that will handle the emergency call, will access to determine a dispatchable location for the individual; and (B) initiating, by one or more computer processors, a request for emergency services, to the public-safety answering point, regarding an emergency involving the particular individual.

In particular embodiments, a computer-implemented method of facilitating determining a location of an individual in the context of the individual using a mobile computing device to place a request for emergency services comprises: (1) receiving, by one or more computer processors, a first indication that the individual has used a user interface of the device to select a first particular digit of an emergency number; (2) at least partially in response to receiving the first indication, transmitting a first set of telemetry data from the mobile computing device to one or more remote computers for use in determining the individual's current location; (3) after receiving the first indication, receiving, by one or more computer processors, a second indication that the individual has used a caller interface of the mobile device to select a second particular digit of the emergency number; (4) at least partially in response to receiving the second indication, transmitting a second set of telemetry data from the mobile computing device to the one or more remote computers for use in determining the individual's current location, the second set of telemetry optionally data being different than the first set of telemetry data; (5) receiving a request, from the user, to initiate the request for emergency services; and (6) at least partially in response to receiving the request: (A) facilitating a transmission of the individual's determined location to a particular data structure that a public-safety answering point, that will handle the emergency call, will access to determine a dispatchable location for the individual; and (B) initiating, by one or more computer processors, a request for emergency services, to the most appropriate public-safety answering point. In particular embodiments, the individual's determined location is based at least in part on location data selected from a group consisting of: (i) the first set of telemetry data and; (ii) the second set of telemetry data.

In particular embodiments, a computer-implemented method of facilitating determining the location of an individual in the context of an emergency comprises: (1) receiving, by one or more computer processors, an indication that emergency services are needed, but has not yet initiated an emergency electronic communication; (2) at least partially in response to receiving the indication, automatically initiating monitoring, by one or more computer processors, of the individual's location; (3) transmitting telemetry data, that has been obtained from monitoring the individual's location, to a data structure associated with a public-safety answering point to facilitate a determination of the individual's current location; and (4) facilitating initiation, by one or more computer processors, of an emergency electronic communication, to the public-safety answering point, regarding an emergency involving the particular individual.

BRIEF DESCRIPTION OF THE DRAWINGS

Various embodiments of caller location determination systems and methods are described below. In the course of this description, reference will be made to the accompanying drawings, which are not necessarily drawn to scale and wherein:

FIGS. 5-9 are example screen shots of a graphical user interface of a system according to a certain embodiment.

DETAILED DESCRIPTION OF SOME EMBODIMENTS

Figure 1:
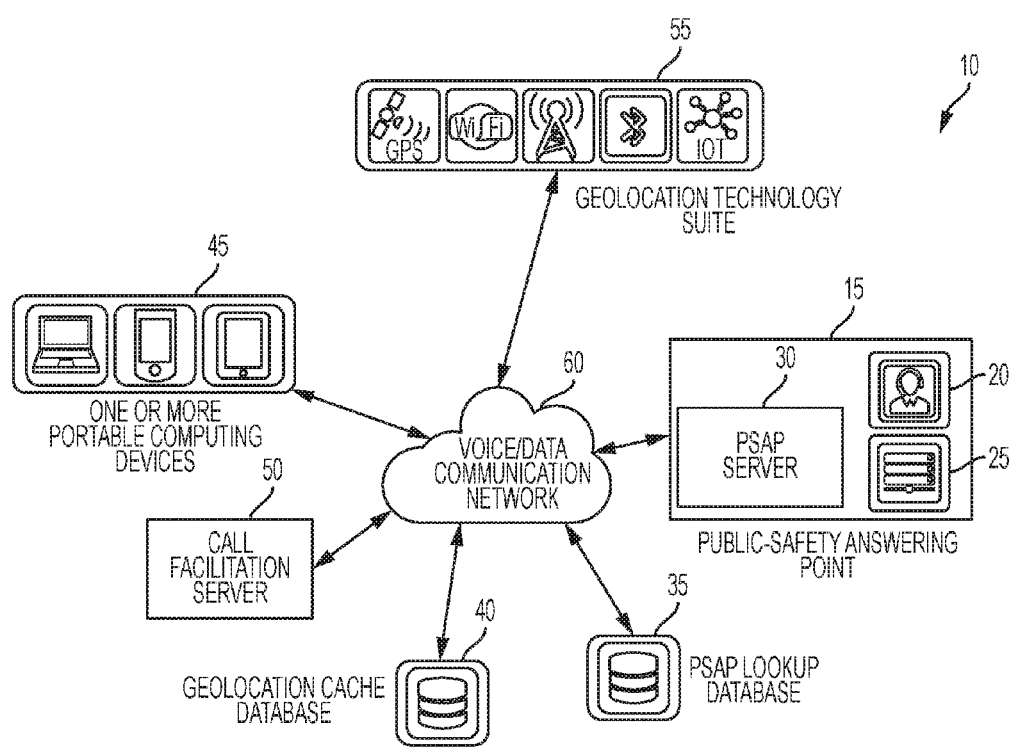
FIG. 1 is a block diagram of a Caller Location Determination System in accordance with an embodiment of the present system.

Various embodiments will now be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Systems and methods according to various embodiments may be used to initiate and/or mediate an emergency call and to facilitate providing an accurate dispatchable location to an emergency services provider that is handling the call. In particular embodiments, the system is adapted to collect telemetry information from various sources, which may be endogenous and/or exogenous to the voice communications device (or other communications device) being used to place the emergency call (which may be a computing device, such as a smartphone, tablet computer, etc., with or without cellular communications capabilities, a personal "wearable" device with data and/or voice communications capabilities, a virtual assistant device (e.g. Amazon Echo, Google Home or other similar device)). The system may then relay some or all available telemetry data to a central geolocation cache database. When the need arises for an individual to request emergency assistance (or other assistance), the system analyzes some or all available data stored in the geolocation database (e.g., at least substantially in real time—e.g., in real time) to determine the most likely candidate dispatchable location and to then cause the dispatchable location to be communicated, at least substantially in real time (e.g., in real time or near real time), to a database associated with the PSAP that will be handling a request for emergency services from the individual and, subsequently, to the individual (e.g., employee) at the PSAP that answers the request for emergency services for assistance. Particular embodiments may also be adapted to facilitate placement of, and/or mediation of, the request for emergency services from the individual to the PSAP.

Systems and methods according to particular embodiments provide one or more user-controlled mechanisms that may supplement and/or replace some or all of the telemetry data communicated to the geolocation cache database and to optionally update the geolocation database and, optionally in near real time or real time, further update the PSAP lookup database with a dispatchable location provided by the user of the communications device (e.g., voice communications device). Certain, but not all possible embodiments use existing technologies, frameworks and architectures so as to not require expensive hardware and/or software upgrades on the part of the PSAPs, network providers, mobile phone service providers, or other entities.

In various embodiments, the system may be adapted to accurately determine and communicate the current location of a caller who is making an emergency call (or other call) using a portable computing device, such as a cellular phone (e.g., a smartphone), VOIP telephone, or tablet computer. In various embodiments, the system allows a user to use a software application (e.g., an "app" running on their portable computing device, or an operating system of a particular computing device) to communicate geolocation telemetry and/or specify their likely location when the user is in one or more particular geographical locations. As a particular example, the user might specify that, when they are identified as being within a pre-determined radius (e.g., a 100-yard radius) of their workplace, their likely location is at their workplace, on the second floor, in office 212. Similarly, the user might specify that, when they are identified as being within a pre-determined (e.g., optionally user-selectable) radius (e.g., a 50 yard radius) of their home, their likely location is at their home.

The system may be configured to automatically update the user's current location in the system's memory based on the user's current location. For example, if the user travels from their home to work, the system may: (1) in response to the user moving outside of the pre-determined radius of their home, automatically update the user's location from "222 Peachtree Lane, Atlanta, Ga." (their home address) to the user's current location, as determined by executing an algorithm utilizing the various telemetry data stored in the geolocation cache database; and (2) in response to the user moving within a pre-determined radius of their workplace, automatically update the user's current location to "111

Workplace Avenue, Atlanta, Ga." (the user's work address). In this way, the system may track, in real time, detailed information regarding the individual's most likely location based on the current indicated location of their portable computing device (e.g., smartphone).

In particular embodiments, at least partially in response to the user using their portable computing device to initiate a request for emergency services, the system first communicates the individual's current location (as determined above) along with the individual's phone number to a database associated with an emergency service provider (e.g., a "PSAP Lookup Database" such as a public automatic line information database) to indicate that the most likely dispatchable location of the portable computing device associated with the individual's phone number is the individual's communicated current location. During this transmission, the system may also transmit any other suitable information regarding the individual—for example, a photo of the individual, information regarding the individual's medical history (e.g., allergies to medicine, recent medical procedures, etc.), and/or contact information for one or more people who hold the individual's medical power of attorney, next of kin and other relevant information.

After (or optionally during or before) the transmission of this information, the system may initiate and/or mediate a request for emergency services from the individual to the emergency service provider. After answering the call, an emergency service provider representative answers the request for emergency services and the representative's computer automatically retrieves the dispatchable location information for the individual by using the incoming phone number as a key in the PSAP Lookup Database. The representative's computer system may then convey the information to the emergency service provider representative in any suitable manner (e.g., by displaying the information on the representative's display screen). The representative may then use this information to direct emergency workers (e.g., a first responder) to the individual's current location.

In particular embodiments, the system may be configured to allow a first individual to place an emergency request for emergency services on behalf of a second individual, who is with the first individual and who is in need of emergency assistance. In one such embodiment, the system may be configured to allow the first individual to input the second individual's name into the system (e.g., via a suitable graphical user interface) along with any other pertinent information regarding the second individual (e.g., the second individual's telephone number or other contact information, and/or the second individual's appearance, current physical condition, medical background, etc.). The system then determines a current dispatchable location for the first individual as described elsewhere herein) and communicates the second individual's name and other pertinent information, along with the determined current dispatchable location for the first individual and the first individual's phone number (and/or, optionally, show the second individual's telephone number or other contact information), to a database associated with an emergency service provider (e.g., a "PSAP Lookup Database" such as a public automatic line information database).

As described in greater detail elsewhere herein, the system may then initiate a request for emergency services to the emergency service provider. The emergency service provider may then use either the first individual's phone number (or other uniquely identifying data for the first individual) or the second individual's phone number (or other uniquely identifying data for the second individual) as a key to look up information from the database, associated with the emergency service provider, that was previously updated by the system (e.g., immediately before the emergency call was placed to the emergency service provider). The emergency service provider's computer system then displays the current dispatchable location of the first individual, the second individual's name, and the other pertinent information regarding the second individual to an emergency service representative (e.g., via a suitable display screen), and the emergency service representative then uses that information to dispatch a suitable emergency service provider to the second individual.

In other embodiments, if a caller (e.g., the first individual) is not in the same location as the individual who is in need of assistance (e.g., the second individual), the system may operate as described above except that, instead of effectively using the first individual's dispatchable location as the second individual's dispatchable location, the system may have the first individual specify the actual location of the second individual (e.g., by entering the second individual's current address, room number, etc. into the system using a suitable graphical user interface, or selecting a location, via a suitable user interface, that was previously entered into the system), and then determine a suitable dispatchable location for the second individual based on the location information provided by the first individual. (This process may or may not, for example, involve using the "snap-to" techniques described in greater detail below.) The system then functions as described above except that, rather than updating the database associated with the emergency service provider (e.g., the PSAP database or other suitable database) with a dispatchable location that has been calculated based on the first individual's whereabouts, the system updates the database with the determined dispatchable location for the second individual.

Exemplary Technical Platforms

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of Internet-implemented computer software. Any suitable computer-readable storage medium may be utilized including, for example, hard disks, thumb drives, compact disks, DVDs, optical storage devices, and/or magnetic storage devices.

Various embodiments are described below with reference to block diagram and flowchart illustrations of methods, apparatuses, (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus that can direct a computer or other programmable data processing apparatus to function in a particular manner such that the instructions stored in the computer-readable memory produce an article of manufacture that is configured for implementing the functions specified in the flowchart block or blocks.

The computer instructions may execute entirely on the user's computer, partly on the user's computer, as a stand-alone software package, partly on a user's computer and partly on a remote computer, or entirely on the remote computer or server. The remote computer may be connected to the user's computer through any suitable type of network, including but not limited to: (1) a local area network (LAN); (2) a wide area network (WAN); and/or (3) a cellular network. It should be understood that a particular computer's connection to the network may be made via an external computer (for example, by connecting to the interne via a "hotspot" provided by a portable wireless device).

The computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer-implemented process (e.g., method) such that the instructions that execute on the computer or other programmable apparatus provide steps for implementing the functions specified in the flowchart block or blocks.

Example System Architecture

FIG. 1 is a block diagram of a caller location determination system 10 according to particular embodiments. As may be understood from this figure, the caller location determination system 10 includes: (1) one or more portable computing devices 45, which may, for example, include one or more cellular phones (e.g., a smartphone or traditional cellular phone), tablet computers, and/or laptop computers; (2) a call facilitation server 50 that may, for example, be remote from the one or more remote computing devices 45; (3) a geolocation cache database 40 that may include hardware and/or software that facilitates determining the geographic location of the one or more portable computing devices 45 and (4) a geolocation telemetry collection technology suite, which may include one or more devices for acquiring the telemetry related to the geographic location of the one or more portable computing devices 45; this geolocation technology suite may include hardware that is located on or within the one or more portable computing devices 45 and may include, for example, a GPS unit within the one or more portable computing devices 45, one or more accelerometers within the one or more portable computing devices 45, one or more wireless networking chips within the one or more portable computing devices 45, one or more Bluetooth chips stored within the wireless computing devices, one or more barometers stored within the one or more portable computing devices 45, and/or one or more devices located outside the one or more portable computing devices 45 (e.g., one or more cellular towers that are adapted for approximating the location of the one or more portable computing devices 45 via triangulation techniques, one or more wireless routers, etc.)

As may be understood from FIG. 1, the system may also include a call processing system 25 and a Public Safety Answering Point Server 30 that, for example, may be located at a Public Safety Answering Point 15 that is staffed by one or more PSAP representatives 20. The system may further include a PSAP Lookup Database 60 (which may be, for example, a public automatic line information database) that is used for storing information (e.g., location information) that is associated with respective phone numbers (e.g., cell phone numbers or Voice-Over-IP (VOIP) numbers) and a Geolocation Cache Database 40.

The system may further include one or more voice and/or data communication networks 60 for initiating and/or mediating communication between the various system components discussed above. These one or more networks 60 may include any of a variety of types of wired or wireless computer networks such as the Internet (or other WAN), a private intranet, a mesh network, a public switch telephone network (PSTN), or any other type of network (e.g., a network that uses Bluetooth (standard or low energy Bluetooth), beacon communication technologies (e.g., iBeacon), and/or near field communications to facilitate communication between computing devices).

Figure 2:
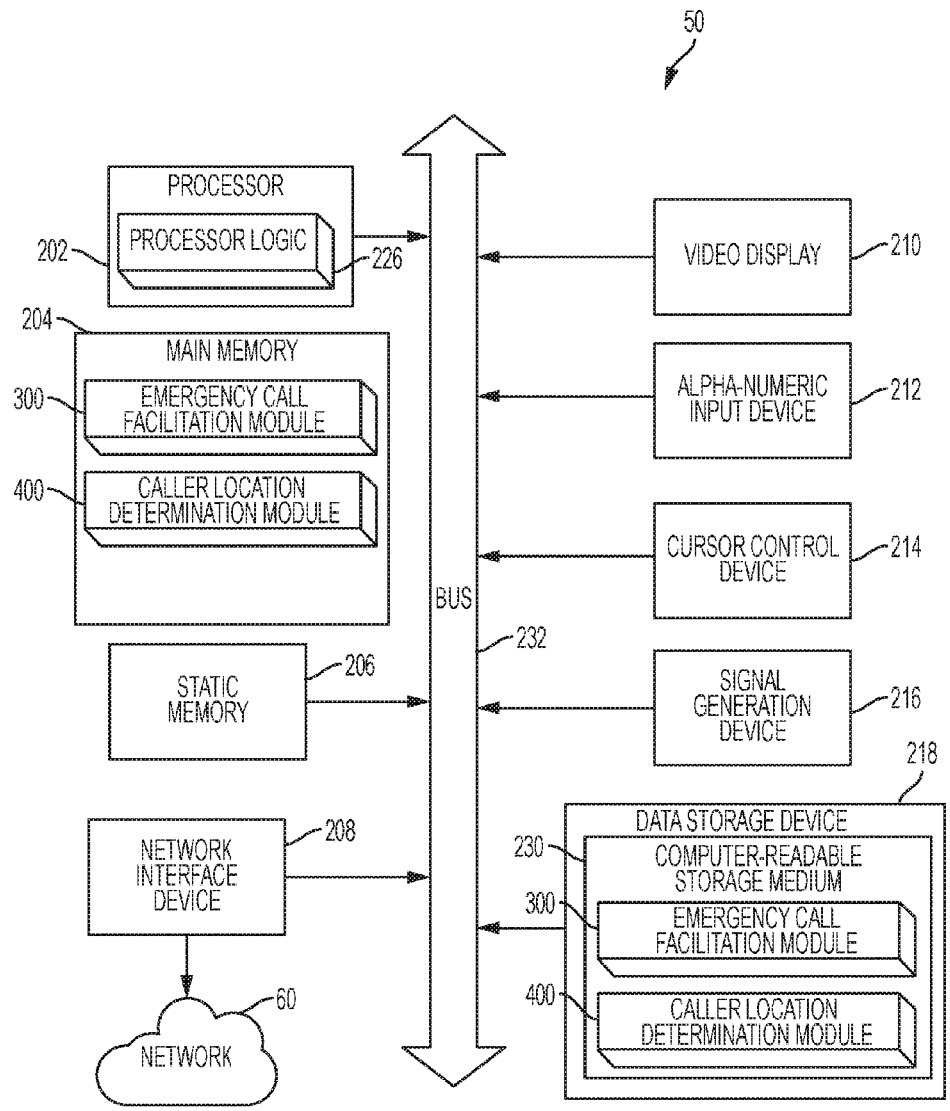
FIG. 2 is a block diagram of the Call Facilitation Server of FIG. 1.

FIG. 2 illustrates an exemplary diagrammatic representation of the architecture of a Call Facilitation Server 50 that may be used within the caller location determination system 10. It should be understood that the computer architecture shown in FIG. 2 may also represent the computer architecture of any one of the one or more portable computing devices 45, the PSAP Server 30 and/or the geolocation cache database 40 shown in FIG. 1.

In particular embodiments, the Call Facilitation Server 50 may be connected (e.g., networked) to other computing devices in a LAN, an intranet, an extranet, and/or the Internet or other suitable network as shown in FIG. 1. As noted above, the Call Facilitation Server 50 may operate in the capacity of a server or a client computing device in a client-server network environment, or as a peer computing device in a peer-to-peer (or distributed) network environment. The Call Facilitation Server 50 may be a desktop personal computing device (PC), a tablet PC, a set-top box (STB), a Personal Digital Assistant (PDA), a cellular telephone, a web appliance, a network router, a switch or bridge, a physical computer server, a cloud-based logical computer server and/or any other computing device capable of executing a set of instructions (sequential or otherwise) that specify actions to be taken by that computing device. Further, while only a single computing device is illustrated, the single term "computing device" (or other such singular terminology referring to a computing device) should also be interpreted to include any collection of computing devices that individually or jointly execute a set (or multiple sets) of instructions to perform any one or more of the methodologies discussed herein.

As shown in FIG. 2, an exemplary Call Facilitation Server 50 includes a processor 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other and other system components via a bus 232.

The processor 202 represents one or more general-purpose or specific processing devices such as a microprocessor, a central processing unit (CPU), or the like. More particularly, the processor 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processor 202 may be configured to execute processing logic 226 for performing various operations and steps discussed herein.

The call facilitation server 50 may further include a network interface device 208. The call facilitation server 50 may also include a video display unit 210 (e.g., a liquid crystal display (LCD) or a cathode ray tube (CRT)), an alpha-numeric input device 212 (e.g., a keyboard), a cursor control device 214 (e.g., a mouse), and a signal generation device 216 (e.g., a speaker).

The data storage device 218 may include a non-transitory computer readable storage medium 230 (also known as a non-transitory computer-readable medium) on which is stored one or more sets of instructions (e.g., the emergency call facilitation module 300 and the location determination module 400) embodying any one or more of the methodologies or functions described herein. The emergency call facilitation module 300 and the location determination module 400 may also reside, completely or at least partially, within the main memory 204 and/or within the processor 202 during execution thereof by the Call Facilitation Server 50—the main memory 204 and the processing device 202 also constituting non-transitory computer-readable storage media. The emergency call facilitation module 300 and the location determination module 400 may further be transmitted or received over a network 60 via a network interface device 208.

The network 60 although illustrated as one "cloud" for the sake of brevity and ease of understanding should be understood to include one or more LANs, one or more virtual LANs, the Internet, one or more extranets, one or more WANs and/or other any other suitable networking topologies that facilitate the movement of data from one computing device to another. As is commonly understood in the art, each of the aforementioned networks may or may not have the ability to communicate directly with each other. By way of one example, data that is destined for the Geolocation Cache Database 40 may traverse the public Internet but once received, may then be communicated (e.g., along with other data derived from the original data) via a private LAN to the Call Facilitation Server 50.

While the computing device-accessible storage medium 230 is shown in an exemplary embodiment to be a single medium, the term "computer readable medium" should be understood to include a single medium or multiple media (e.g., a centralized or distributed database, and/or associated caches and servers) that store the one or more sets of instructions. The terms "computing device-accessible storage medium" or "computer-readable medium" should also be understood to include any medium that is capable of storing, encoding, or carrying a set of instructions for execution by the computing device and that may, for example, cause the computing device to execute any one or more of the methodologies of the present invention. The terms "computing device-accessible storage medium" and "computer-readable medium" should accordingly be understood to include, but not be limited to, solid-state memories, optical and magnetic media, etc.

Operation of Exemplary System

As noted above, a caller location determination system 10, according to various embodiments, is adapted to gather telemetry related to one or more particular locations, track and/or determine the location of an individual and to communicate the individual's most likely dispatchable location to an emergency services provider (e.g., a representative at a Public-Safety Access Point). This may be useful, for example, in identifying the current location of the individual after they initiate a call to a Public-Safety Access Point requesting help in case of an emergency.

Figure 3:
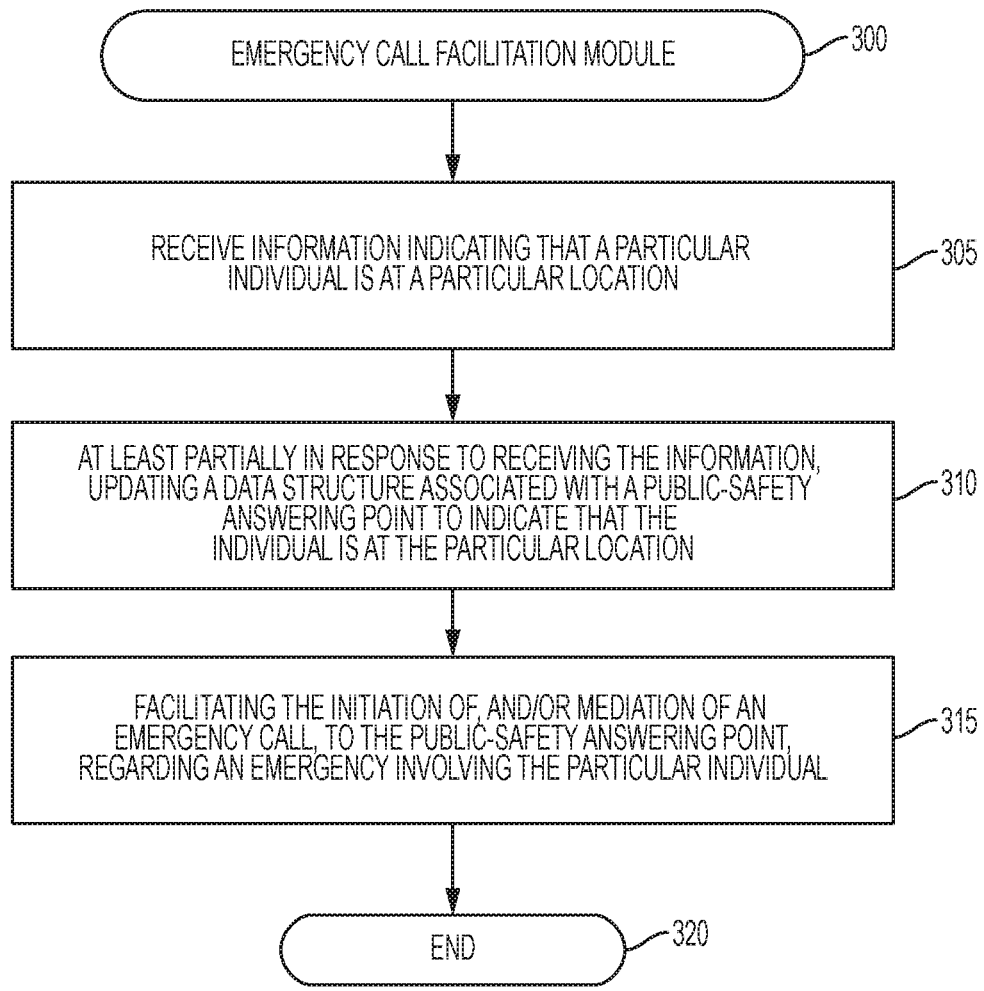
FIG. 3 is a flowchart that generally illustrates various steps executed by an Emergency Call Facilitation Module according to a particular embodiment.

FIG. 3 is a flow chart of operations performed by an exemplary Emergency Call Facilitation Module 300 according to a particular embodiment. Turning to FIG. 3, the system begins, at Step 305, by receiving information that a particular individual is at a particular location. The system may do this in any suitable way.

As a particular example, the system may receive information regarding the location of the particular individual from one or more components of a geolocation technology suite 55. For purposes of this discussion, a geolocation technology suite 55 may include, for example, one or more exogenous or endogenous systems or components that may be used in determining the location of an individual (e.g., by determining the location of a computing device in the individual's possession). For example, a geolocation technology suite 55, according to various embodiments, may include: (1) one or more GPS units associated with one or more portable computing devices 45 associated with the individual (e.g., the individual's smartphone, tablet, wearable device, etc. . . . ); (2) one or more networks 60 (e.g., wireless or wired networks) that a portable computing device associated with the individual is connected to; (3) one or more cell towers that a portable computing device associated with the individual is in communication with; (4) one or more computing devices that a portable computing device 45 associated with the individual is in communication with (e.g., via beacon technology); and/or (5) one or more RF receivers (e.g., one or more AM or FM radio receivers, or television receivers) associated with (e.g., physically embodied within) a portable computing device associated with the individual.

The system may receive the geolocation data from the geolocation technology suite 55 in any suitable manner. For example, an application running on the individual's portable computing device may be adapted to capture at least some of this information and transmit the information, via one or more suitable networks 60, to the geolocation cache database 40. In other embodiments, an operating system associated with the individual's portable computing device 45 may capture the location information and transmit the information to the geolocation cache database 40 via one or more suitable networks 60. In further embodiments, one or more third party portable computing devices (or other computing devices) that are not associated with (e.g., not owned or used by) the particular individual may run an application that automatically broadcasts the location of the particular individual in response to receiving an indication (e.g., via Bluetooth or beacon communications) that one or more of the individual's portable computing devices is adjacent the third party portable computing device.

It should be understood that the geolocation technology suite may determine and/or approximate the location of the individual in any suitable manner. For example, the system (or one or more other systems that are in communication with the system) may use information from one or more cellular towers to approximate the location of a portable computing device associated with the individual (and then assume that the individual is at same location as their portable computing device). Similarly, the system may approximate the location of an individual by first determining that the individual's portable computing device 45 is in communication a particular wireless network having a particular MAC address and then approximate the location of the individual (e.g., again assuming that the individual is near their portable computing device) by accessing a suitable database to determine a physical address associated with the MAC address.

As a further example, the system may, in various embodiments, be adapted to receive data regarding the reception of one or more RF signals (e.g., from any suitable source) adjacent the individual. For example, the system may use a radio receiver of a portable computing device associated with the individual to determine whether the radio receives one or more specific radio stations. The system may then use this information to determine at least the approximate current location of the individual. For example, the system may be adapted to tune an FM receiver of the individual's portable computing device to a particular FM frequency (e.g., 100.7 MHz) and then read the data channel to determine whether the station is a particular station that is associated with a particular geographic location (e.g., WHYI FM, which is broadcast only in South Florida). If so, the system may use this information to determine, for example, that the individual is currently in the particular geolocation. (e.g., in South Florida).

As another example, the system may use the portable computing device's FM receiver to scan the entire FM spectrum, and then enumerate all of the commercially broadcast radio stations and their relative signal strengths. The system may then use the determined FM signals and signal strengths to determine an approximate location of the individual. Similar techniques may be used for AM radio, television, and/or other RF signals (e.g., signals sent by satellites or other types of broadcasting equipment) through which a location may be inferred, or at least partially inferred, by either the existence of an RF signal and/or information encoded into the signal.

In certain embodiments, the system may receive information, from one or more social networking cites, indicating that a particular individual is at a particular location. For example, the system may receive an indication that the individual has "checked in" to a particular location on a social networking site, such as Foursquare. Similarly, the system may receive an indication that the individual has updated their status on a social networking site to indicate that they are at a particular location. In certain embodiments, the system may receive the individual's location from one or more social networking sites and/or operating systems that continuously track the location of the individual's portable computing device (e.g., smartphone or tablet). Examples may include, for example, the Tile application or a portable computing device operating system, such as iOS.

The system may also, or alternatively, determine the location of a particular individual by reviewing one or more communications sent from, or to, the individual. For example, the system may be adapted to review any electronic communications sent by or to the individual's portable computing device (or other computing device, or electronic communications account, such as e-mail or Twitter) to determine the individual's location. For example, the system may be adapted to automatically review any "Tweets" sent by an individual to determine whether they include an indication of the individual's current location. As a particular example, if the individual sends a Tweet, or other electronic communication, indicating that they are currently at NOCA restaurant in Roswell, Ga., the system may use this as an indication that the individual is located at an address associated with the restaurant NOCA in Roswell, Ga. (which the system may obtain from a suitable database of business addresses).

In various embodiments, the system may determine the likely location of an individual by "snapping to" the location of the individual. This functionality is discussed in greater detail below in conjunction with FIG. 4. For example, various embodiments of the system are described above as automatically associating a particular likely location with an individual if: (1) the individual is within a predetermined distance of the likely location, or (2) if the individual is within a particular geographic region that contains the likely location.

In particular embodiments, the system may receive a manual indication (e.g., an explicit manual indication) from a user regarding the user's location. For example, before placing an emergency call (e.g., immediately before placing the call), or while on the call, the user may select a particular indicia on a graphical user interface associated with a particular application running on their smartphone (or other portable computing device 45) indicating that they are currently at their home or office address, or in another address that, for example, may have been preprogrammed into the system's memory (e.g., using the software application). For example, the system may request that the user select one of the user's pre-entered locations when the user uses the system to initiate the emergency call. (See, for example, FIG. 7, which shows a system that allows the user to select between four different pre-entered locations (e.g., "My Home", "My Main Office", "Grandma's House", "Steve's Apartment") before placing an emergency call. In particular embodiments, the system may be adapted to allow a user to manually type their current location into the system immediately before or during the emergency call.

In various embodiments, after receiving information from one or more sources regarding the current location of the individual, the system applies a pre-determined set of rules (e.g., a location-determination algorithm) to determine a most likely current dispatchable location for the individual. In various embodiments, the system may, for example, be configured to regard certain types of location information as more accurate than others and to use those more accurate sources of information in favor of other sources when necessary to choose between information from multiple sources.

Also, the system may be configured to take the number of location sources indicating that a particular individual is at a particular location into account when determining the most likely location of an individual. For example, if the system receives information from four different sources indicating that an individual is at a particular movie theater, and the system receives information from a single source indicating that the individual is at home, the system may be adapted to determine that the individual is likely at the movie theater since multiple sources indicate that the individual is at the movie theater, and only a single source indicates that the individual is at home.

The following are several examples of rules that the system may follow when determining the most likely dispatchable location of an individual from a multiple location sources that, respectively, indicate different locations for an individual: (1) prefer location information that was provided manually by an individual over all other location information; (2) prefer GPS information over information determined using triangulation techniques; (3) prefer information derived from direct communication between the individual's portable computing device and a particular network or computing device over information determined using triangulation techniques.

Returning to FIG. 3, in various embodiments, at Step 310, the system is adapted for, at least partially in response to determining the most likely dispatchable location for the individual (e.g., after making this determination), updating a data structure associated with a public-safety answering point to indicate that the individual is at the determined dispatchable location. For example, the system may (e.g., using a suitable API) update a public ALI database that is used by the PSAP to indicate that the individual is at the system-determined dispatchable location. The system may do this, for example, by updating one or more records in the database to indicate that the portable computing device associated with the individual's cellular phone number is located at the system-determined dispatchable location. In other embodiments, the system may update the PSAP's database directly (e.g., in this same manner) to reflect the individual's current location.

As discussed in greater detail below, the system may update the data structure associated with the public-safety answering point with any suitable information. Such information may include, for example: (1) the individual's current dispatchable location; (2) the actual longitude and latitude of the user's portable computing device 45; (3) the location of an individual within a particular building (e.g., a particular room description or room number); (4) a description of the individual (e.g., the individual's gender, age, height, hair color, and/or eye color); (5) one or more medical conditions of the individual (e.g., one or more allergies of the individual); (6) the fact that the individual is blind, deaf, or unable to speak; (7) one or more languages spoken by the individual; (8) one or more images of the individual (e.g., pictures or videos); (9) contact information for one or more individuals associated with the particular individual (e.g., one or more emergency contacts for the individual); or (10) any other suitable information for the individual. In particular embodiments, the information may include one or more links to one or more of the types of information described above (e.g., the information may include a link to a picture of the individual, or a link to the individual's electronic medical records).

Next, the system proceeds to Step 315, where it facilitates the initiation of, and/or mediation of, an emergency call to the public-safety answering point (e.g., regarding an emergency involving the individual). The system may do this in any suitable manner using any suitable hardware and/or software. For example, the system may initiate the call via the individual's portable computing device (e.g., the individual's smartphone) and/or use any other suitable communications hardware or software to initiate and/or mediate the call.

In various embodiments, it is noted that the system may include a Call Facilitation Server 50 that may be adapted to act as a communications bridge between the one or more portable computing devices 45 and the Public-Safety Answering Point 15. In particular embodiments, the Call Facilitation Server 50 may be adapted to initiate and maintain a communications channel between the PSAP 15 and the Call Facilitation Server 50 while maintaining a separate communications channel directly with the user's portable computing device 45. This may help to maintain consistent staffing of the emergency call because, even if the communications channel between the user's portable computing device 45 and the Call Facilitation Server 50 becomes unavailable, the connection between the Call Facilitation Sever 50 and the PSAP may be maintained. This may allow the user to re-establish a call with the same emergency services representative by simply reestablishing communications between the user's portable computing device 45 and the Call Facilitation Server 50.

In alternative embodiments, the system may not include a Call Facilitation Server 50. In such embodiments, the system's call generation functionality may, for example, be located entirely on the user's portable computing device. Also, in certain embodiments, one or more functions described herein as being performed by the Call Facilitation Server 50 may be executed by one or more servers that aren't configured to initiate or mediate calls.

In particular embodiments, the system (e.g., the Call Facilitation Server 50, or one or more other system components) may include text-to-speech functionality for using computer-generated sound to communicate information (e.g., the user's current location) to emergency representatives in the course of an emergency call that has been initiated as described above. This may be useful, for example, if the user cannot physically speak, or if they are in a situation where it wouldn't be advisable to speak.

Figure 4:
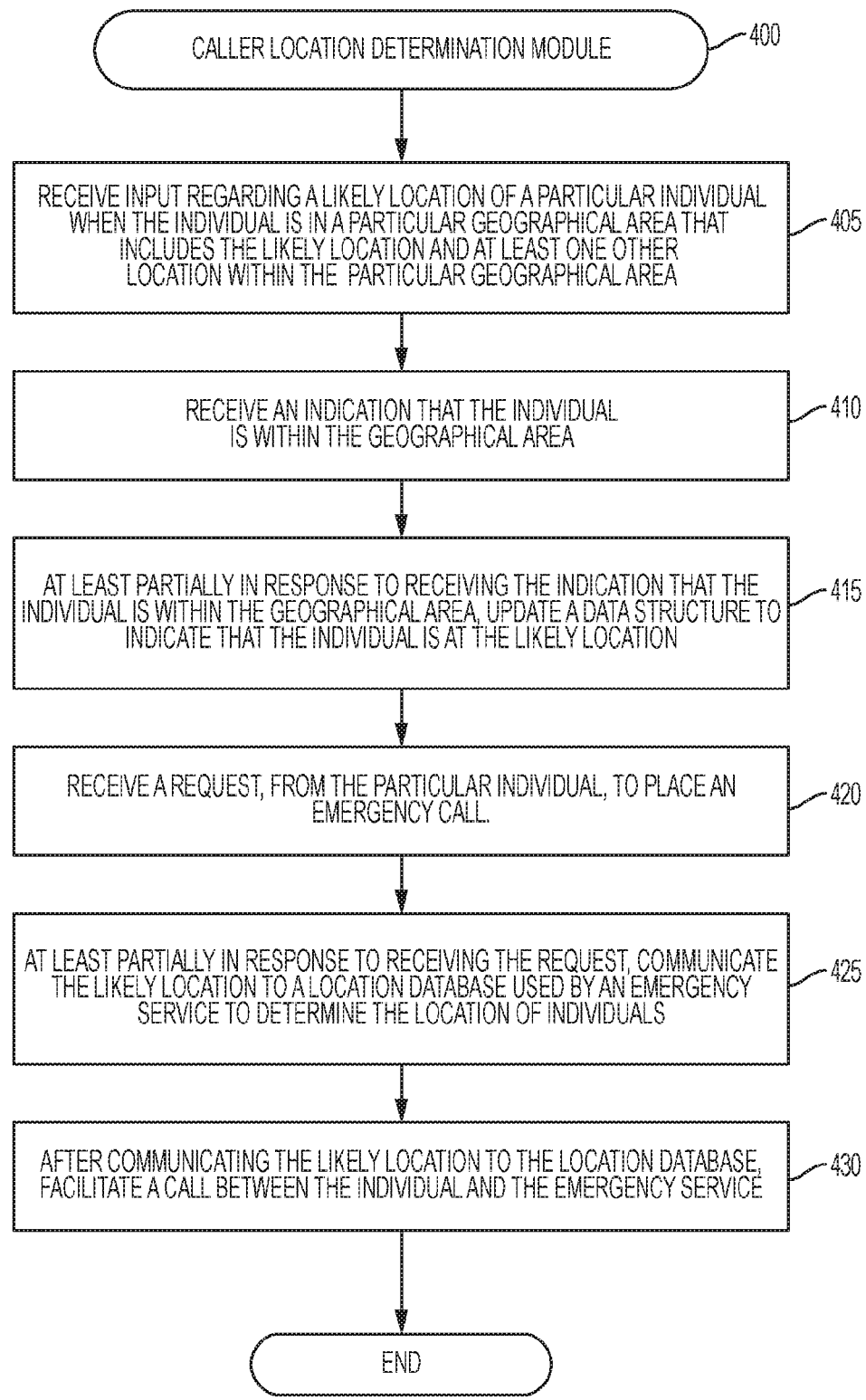
FIG. 4 is a flowchart that generally illustrates various steps executed by a Caller Location Determination Module according to a particular embodiment.

FIG. 4 is a flow chart of operations performed by an exemplary location determination module 400 according to a particular embodiment. Turning to FIG. 4, the system begins, at Step 405, by receiving input regarding a likely location of a particular individual when the individual is in a particular geographical area that includes both the likely location and at least one other location within the particular geographical area. As a particular example, the user might specify that, when they are identified as being within a pre-determined radius (e.g., a 100 yard radius) of their workplace (which the user may define, for example, using an address, a geolocation of the workplace, etc.), their likely location is at their workplace, on the second floor, in the office in the Northwest corner of the building. Similarly, the user might use the system to define a geofence that includes their workplace and specify that, when they are identified as being within the user-defined geofence, their likely location is at their workplace, on the second floor, in office 212. As a further example, the user might specify that, when they are identified as being within a pre-determined radius (e.g., a hundred foot radius) of an address or within a geolocation that corresponds to their home, their likely location is at their home.

As a further example, the system may allow a user to input their likely location at a particular address if they are determined to be at that particular address. For example, if an individual is staying at a particular hotel, after the individual arrives at the hotel and checks in, they may use the system to save, to the system's memory, an indication that, if they are determined to be at the hotel, they will likely be in a particular room in the hotel (e.g., the particular room that the individual is staying in at the hotel—e.g., Room 207).

The system may accept the input described above in any suitable manner. For example, the system may be adapted to store and run an application (e.g., an "app") on a portable computing device 45 (e.g., a smartphone or tablet) associated with the user. In such embodiments, the user may, for example, use a graphical user interface (or other interface) associated with the application to enter one or more location titles along with detailed location information regarding each location.

Figure 7:

An example location input interface screen is shown in FIGS. 5 and 6. As may be understood from this screen, the user interface may be operable to accept a title of a particular location (e.g., "Ryan's House") along with location information (e.g., an address and/or geocode for the location) for that particular location. As shown in FIG. 7, the system may enter multiple locations into the system (e.g., the individual's home address, work address, gym address, friends' addresses, etc.)

Returning to FIG. 4, after the user enters one or more locations into the system, the may track the location of the user (e.g., in real time, substantially in real time, or with a time delay) using any suitable location tracking technique (e.g., by tracking the location of a portable computing device or other location detection device associated with the user—such as the user's smartphone, smart watch, tablet computer, GPS chip, etc.; by tracking user's location via one or more social media web sites; by tracking the location of a vehicle associated with the user; or by using any other suitable location-tracking technique).

As the system tracks the user, the system may, for example at Step 410, receive an indication that the individual is within one of the geographical areas that the system received information regarding at Step 405. In various embodiments, the system may, at least partially in response to receiving the indication that the individual is within the geographical area, update a data structure (e.g., a PSAP Lookup Database 35, or other database associated with one or more emergency service providers, or any other suitable data structure) to indicate that the individual is at the likely location. During this transmission (or as part of a separate transmission), the system may also update the data structure to include any other suitable information regarding the individual—for example, information regarding the individual's medical history (e.g., allergies to medicine, recent medical procedures, etc.), or contact information for a person who holds the individual's medical power of attorney.

Figure 8:
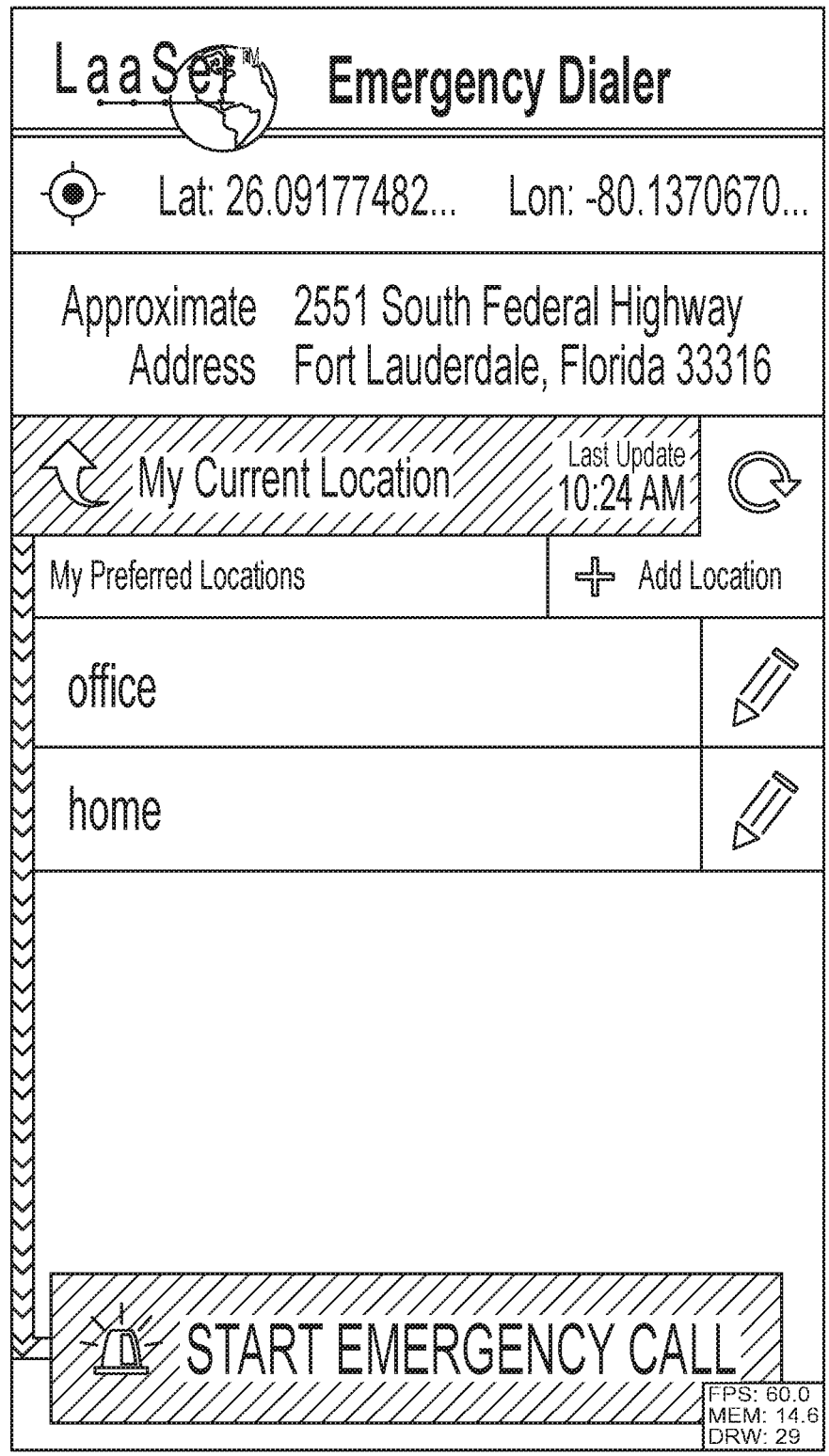
Figure 9:

The system may also, at least partially in response to receiving the indication that the individual is within the geographical area, change a graphical user interface associated with the system to indicate that the system has determined that the user is at the likely location. For example, FIGS. 8 and 9 show the system's progression between showing that the user is not at the user's office (See FIG. 8, in which the user's office is not highlighted), and showing that the user is at the user's office (See FIG. 9, in which the user's office is highlighted and the system is displaying an indication (e.g., an alphanumeric message) that the user is within 150 feet of the user's office and, therefore, the system is listing the user's location as the address of the user's office (4402 Northeast $11^{th}$ Avenue, Oakland Park, Fla.)).

Turning again to FIG. 4, if the user experiences an emergency, the user may initiate a call to emergency services provider. The user may do this, for example, by selecting an appropriate "emergency call" button of a graphical user interface displayed by an application on their portable computing device (e.g., smartphone) 45 (such as the "Start Emergency Call" button shown in FIG. 7), or by simply dialing an appropriate emergency services number (e.g., 911) on their portable computing device. The system then, at Step 420 receives the request from the user to place an emergency call and then, at Step 425, at least partially in response to receiving the request, communicates the likely location to a location database used by an emergency service to determine the location of individuals (e.g., the PSAP Lookup Database 35).

Next, after communicating the likely location to the location database, the system advances to Step 430 where it facilitates a call between the individual and the emergency service provider (e.g., a PSAP). The system may do this, for example, by simply executing a call to a predetermined emergency phone number (e.g., 911, 112, 999, 000, etc.). Alternatively, the system may initiate communications between the individual and the emergency service provider in any other suitable manner (e.g., via video communications, SMS communications, etc.).

After answering the call, an emergency service provider representative answers the call and the representative's computer automatically retrieves position information for the individual by using the incoming number as a key in the PSAP Lookup Database. The representative's computer system may then convey the information to the representative in any suitable manner (e.g., by displaying the information on the representative's display screen). The representative, and/or any suitable computer system may then use this information to direct emergency workers to the individual's current location.

Variations and Additional and Alternative Embodiments

Various embodiments may include additional features beyond those described above. For example, in particular embodiments, the system may be adapted to allow a user to enter contact information for one or more individuals that the user would like the system to automatically notify if the user places an emergency call. In particular embodiments, in response to the user initiating an emergency call, the system automatically initiates a communication to those one or more individuals. This may, for example, serve to notify the specified individuals of the fact that the user has placed an emergency call. The communication may optionally include the user's location and/or other information, such as one or more automatically generated images from the user's portable computing device. This may allow the specified individuals to provide immediate help to the user and/or to contact an emergency services provider on behalf of the user.

In certain embodiments, the system may be adapted to cause the user's portable computing device to automatically capture data from their present location, which may be useful in determining their present circumstances (e.g., on an ongoing basis until this feature is manually turned off). For example, the system may cause the portable computing device to take a picture every predetermined period of time (e.g., every three seconds) and transmit that picture to an emergency service provider or other individual and/or computer for use in assessing the status of the individual during an emergency (e.g., after the user places an emergency call). The system may also or alternatively activate a microphone associated with the user's portable computing device so that emergency service providers can hear what is happening proximate the user.

In certain embodiments, the system may be adapted to cause the individual's portable computing device to transmit an electronic and/or sound beacon. This may help rescue workers in locating the individual.

Facilitating a Determination of an Individual's Location in Response to Determining that a Request for Emergency Assistance is Imminent In particular embodiments, the system is adapted to: (1) monitor a user's behavior to anticipate a potential future (e.g., imminent) emergency call; and (2) in response to determining that a request for emergency services is likely to be initiated imminently, transmitting, and/or beginning to transmit: (1) telemetry data regarding the user's location (e.g., telemetry data from a mobile computing device that is associated with and/or in the possession of the user) to one or more computers that are remote from the user's mobile computing device and that will use the telemetry data to determine a dispatchable location for the individual.

Later, in response to the user requesting the initiation of the request for emergency services, the system may (1) facilitate (e.g., initiate) the transmission of the determined dispatchable location to the most appropriate PSAP that will handle the emergency call and/or (2) initiate the request for emergency services. In various embodiments, the system may transmit the determined dispatchable location to the PSAP that will handle the request for emergency services before, after, or during the initiation of the request for emergency services.

In particular embodiments, the request for emergency services may be a voice call made using any number of widely used protocols today such as cellular (CDMA, GSM, LTE, VoLTE, etc.), voice over WiFi, or voice over IP. In certain instances where a voice call is either not feasible or is not desired, the request for emergency services may also be made via computer-generated speech, or in any other suitable way.

In particular embodiments, the system may transmit telemetry data for the user for use, by a remote computer in determining the user's location, before the request for emergency services is initiated. This may be advantageous because it may reduce or eliminate delays in providing emergency service to a customer that would otherwise occur if the user's location is not calculated in advance of the request for emergency services being initiated (e.g., delays that include the processing time needed for a computer to calculate the user's location to a particular degree of accuracy after the request for emergency services is initiated, and/or transactional time related to relaying information (e.g., telemetry information) from the user's mobile computing device to a central location-determining computing system (e.g., server), and from the location-determining system (e.g., server) to a computer associated with the PSAP.) This may also be advantageous because some wireless networks, such as wireless networks that use CDMA technology, lose SMS capability when a request for emergency services is initiated and this functionality remains unavailable during the call. Accordingly, in some networks, it may not be possible to transmit data, such as mobile device telemetry data (which may be used by a remote server in determining an individual's location), from a mobile device during an emergency call, or other voice call of any nature.

In various embodiments, the system may monitor the user's behavior, and determine that the user will imminently place a request for emergency services in response to determining that: (1) the user has dialed (e.g., sequentially dialed) one or more numbers that make up one or more digits of an emergency number (e.g., the user has entered the first digit of an emergency number, the user has sequentially entered the first two digits of an emergency number, the user has sequentially entered the first three digits of an emergency number and/or the user has sequentially entered all of the digits of an emergency number, but has not yet selected a "send" key (or the equivalent) to formally initiate the call); (2) the user has spoken one or more words, phrases, or sounds that indicate that the user is likely to imminently initiate a request for emergency services (e.g., the user's mobile computing device has determined, by monitoring signals from a microphone of the mobile computing device or other computing device, that an individual who is close to the mobile computing device has uttered one or more emergency phrases such as "help!", "call 911!", "call the police!", "fire!", etc., or that one or more particular sounds were sensed by the mobile computing device that would indicate the likely occurrence of an emergency (e.g., one or more gunshots, the sound of glass breaking, the sound of an alarm, one or more human screams, the sound of the mobile computing device being dropped, the sound of skidding tire, the sound of a car crash, the sound of material burning, etc.); (3) the mobile computing device has detected movement that: (a) is characteristic of an accident or other emergency event (e.g., one or more motion sensors, such as an accelerometer, gyroscope, and/or GPS unit within the mobile computing device, has determined that the mobile computing device has come to an abrupt stop and/or the one or more motion sensors have detected a change in momentum of the mobile computing device that is consistent with the device and/or its owner being in a car crash, being in a bicycle accident, or suffering a sports injury (e.g., a collision of a skier, snowboarder, or other athlete with an object, such as tree, wall, rock etc. or another person)); or (b) is characteristic of the holder of the mobile computing device falling (e.g., the one or more motion sensors sense a rapid decreased in elevation); and/or (4) the mobile computing device and/or one or more environmental sensors in communication with the mobile computing device have detected environmental conditions that are otherwise indicative of an emergency (e.g., a temperature sensor on the mobile computing device has sensed temperatures over a predetermined threshold (e.g., above 110 degrees Fahrenheit), a sensor associated with the mobile computing device has detected smoke, etc.).

In particular embodiments, the system may facilitate the determination of the user's location in any manner discussed herein, or in any other suitable manner. For example, the system may transmit telemetry data from the user's mobile computing device, or other computing device (e.g., via SMS) to a remote server (e.g., a remote server storing a geolocation cache database, such as the geolocation cache database discussed above), so that the remote server may use the telemetry data and/or any other suitable data to determine the user's current location. Alternatively, or additionally, the system may determine the user's location locally (e.g., using one or more computer processors of the user's mobile computing device). After the user's location is determined (e.g., either at a remote server or locally), the system may transmit the user's location (and/or begin to transmit data packets indicating the user's location) to a database that will be used by a PSAP server (or other server) to determine the individual's location. This transmission may occur before, while, or after the call (or other electronic communication) to the emergency services provider is initiated, and may occur at any point in any appropriate process described herein (for example, while executing the first, second, or third predetermined series of steps discussed in the example below).

In particular embodiments, the system may take particular (in various embodiments, increasingly comprehensive) steps to gather information regarding a user's location as it becomes more likely that the user will imminently initiate an emergency call (or other emergency communication). For example, if an emergency phone number consists of three particular alphanumeric characters (e.g., "911"), the system may execute a first set of one or more steps to gather information regarding the user's location when the user dials the first alphanumeric character (e.g., "9") in the three-alphanumeric-sequence emergency number (e.g., "911") as a first number in a phone number. The first set of one or more steps may include, for example, transmitting a first set of telemetry data from the user's mobile device to a geolocation cache database 40 that is being executed on one or more computers that are remote from the user's mobile computing device. Similarly, the system may execute a second set of one or more steps to gather information regarding the user's location if, immediately after dialing the first number in the three-alphanumeric-sequence emergency number, the user dials the second alphanumeric character (e.g., "1") in the sequence. The second set of predetermined steps may include, for example, transmitting a second set of telemetry data—that is more comprehensive than, or additive to—the first set of telemetry data—to the geolocation cache database 40. The system may further execute a third set of one or more steps to gather information regarding the user's location if, immediately after dialing the first and second alphanumeric characters in the three-alphanumeric-sequence emergency number, the user dials the third alphanumeric character (e.g., another "1") in the sequence. This third set of one or more steps may include, for example, transmitting a third set of telemetry data—that is additive to, and/or more comprehensive than the first set and/or second sets of telemetry data—from the user's mobile computing device to the geolocation cache database 40). In various embodiments, following this approach may reduce or eliminate any delays that would otherwise be caused by the system gathering information regarding the user's location (e.g., telemetry data from the user's smartphone, tablet computer, wearable computing device, and/or other mobile computing device) in response to the initiation of a request for emergency services or other correspondence, while also not requiring the system to use the potentially large amount of computing resources and local power needed to monitor and determine the user's location on an ongoing basis (e.g., actively monitor the user's location).

A first example of the general approach described above is shown in FIG. 10, which shows a call-dialing graphical user interface on a user's portable computing device (e.g., smartphone, tablet computer, laptop computer etc.). As shown in this figure, proceeding from left to right, the user first dials "9". In response to the user dialing "9", the system takes no action. Next, the user dials "1" and, in response, the system transmits a first set of telemetry data from the user's mobile computing device to the geolocation cache database 40. Next, the user dials "1" a second time and, in response, the system transmits a second set of telemetry data (which may be additive to and/or more comprehensive than, the first set of telemetry data) from the user's mobile computing device to the geolocation cache database 40. Finally, the user's selects the "initiate call" button (which is labeled with a telephone sign in FIG. 10) and, in response, the system: (1) determines a dispatchable location for the user based at least in part on the first and/or second sets of telemetry data; (2) facilitates the transmission of (e.g., transmits and/or initiates the transmission of) the user's determined location to a database that will be accessed, to determine the user's location, by a PSAP that will be handling the request for emergency services from the user (e.g., the PSAP that has been assigned to handle emergency calls from the user's current and/or determined dispatchable location); and (3) initiates a request for emergency services to the PSAP. The step of determining a dispatchable location for the user and/or the step of determining which PSAP will be handling an emergency call from the user at the determined dispatchable location may be executed by one or more computers that are remote from the user's mobile computing device and/or by the user's mobile computing device.

Figure 10:
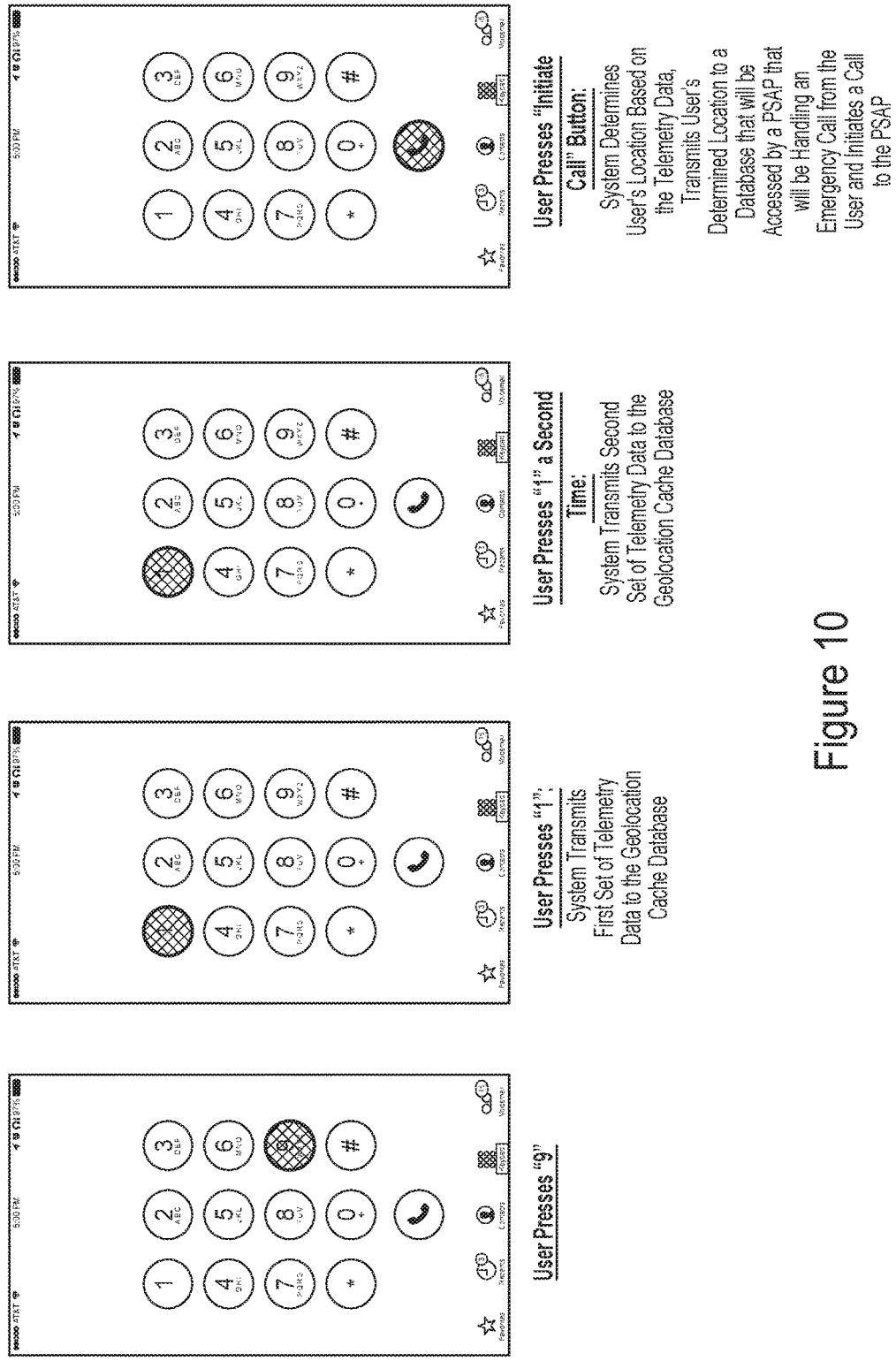
FIG. 10 is a first sequence of screen shots from a user dialing interface of a portable computing device, where selected numbers that are selected by a user are shown hatched.

In particular variations of the example described above, the system may transmit, and/or begin to transmit, telematics data to the geolocation cache database 40 in response to the occurrence of any of the four steps shown in FIG. 10, or any other suitable event indicating that the user will imminently initiate an electronic request for emergency assistance. For example, the system may initiate the transmission of (and/or complete the transmission of) one or more types of telemetry data from the user's mobile computing device to the geolocation cache database 40 in response to the user: (1) opening a software application on their mobile device that may be used to initiate an emergency communication; (2) using their mobile computing device to dial one or more particular alphanumeric characters and/or particular sequences of alphanumeric characters; and/or (3) speaking one or more predetermined words or phrases that that are associated with (e.g., are part of) a verbal command to place an emergency call, but that have not yet caused the mobile computing device to initiate a request for emergency services (e.g., "Hey Siri . . . please dial 9 . . . 1 . . . .")

In various embodiments, including those described above and other embodiments, the system may actually determine the user's location (in increasingly accurate ways) as it becomes more likely that the user will imminently initiate an emergency call (or other request for emergency services). For example, if an emergency phone number consists of three particular alphanumeric characters (e.g., "911", "112", "000", or "999"), the system may execute a first set of one or more steps to determine the user's location (e.g., to a first level of accuracy) when the user dials the first alphanumeric character (e.g., "9") in the three-alphanumeric-sequence emergency number (e.g., "911") as a first number in a phone number. Similarly, the system may execute a second set of one or more steps to determine the user's location (e.g., more detailed steps than the first set of steps) to determine the user's location to a second, more specific level of accuracy if, immediately after dialing the first number in the three-alphanumeric-sequence emergency number, the user dials the second alphanumeric character (e.g., "1") in the sequence. The system may further execute a third set of one or more steps to determine the user's location if, immediately after dialing the first and second alphanumeric characters in the three-alphanumeric-sequence emergency number, the user dials the third alphanumeric character (e.g., another "1") in the sequence. The third set of one or more steps may comprise more detailed steps than the second set of one or more steps and may determine the user's location to a third, even more specific level of accuracy. In various embodiments, following this approach may reduce or eliminate any delays that would otherwise be caused by the system determining the user's location in response to the initiation of a request for emergency services or other correspondence, while also not requiring the system to use the potentially large amount of computing resources and local power needed to monitor and determine the user's location on an ongoing basis (e.g., actively monitor the user's location.)

An example of the operation described above is shown in FIG. 11, which shows a call-dialing graphical user interface on a user's portable computing device (e.g., smartphone, tablet computer, laptop computer etc.). As shown in this figure, proceeding from left to right, the user first dials "9". In response to the user dialing "9", the system takes no action. Next, the user dials "1" and, in response, the system determines the user's location to a first degree of certainty. Next, the user dials "1" a second time and, in response, the system determines the user's location to a second, higher degree of certainty. Finally, the user selects the "initiate call" button (which is labeled with a telephone sign in FIG. 10) and, in response, the system: (1) transmits the user's determined location to a database that will be accessed, to determine the user's location, by a PSAP that will be handling the request for emergency services from the user (e.g., the PSAP that has been assigned to handle emergency calls from the user's current and/or determined location); and (2) initiates a request for emergency services to the PSAP.

Figure 11:
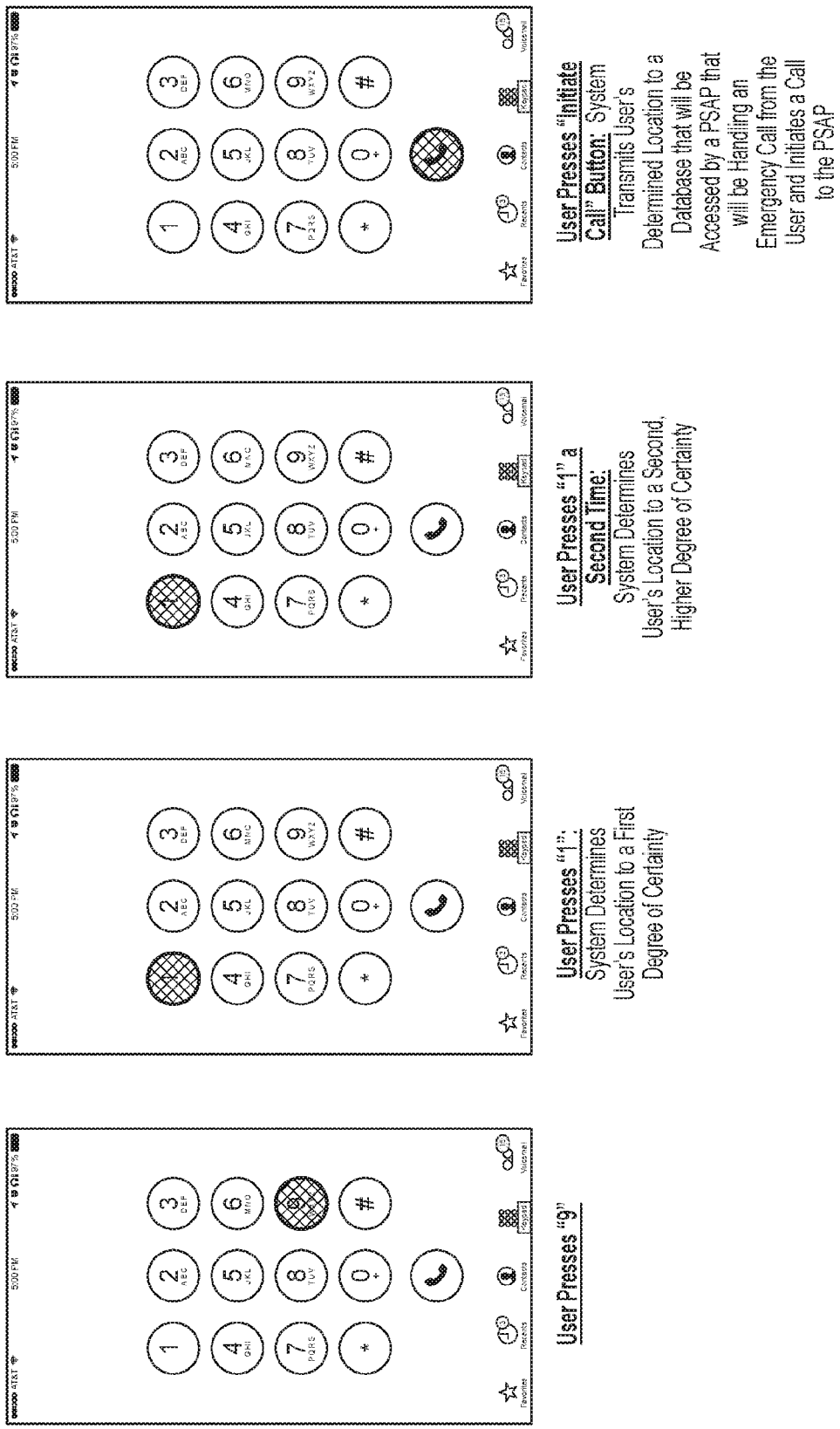
FIG. 11 is a second sequence of screen shots from a user dialing interface of a portable computing device, where selected numbers that are selected by a user are shown hatched.
Figure 12:
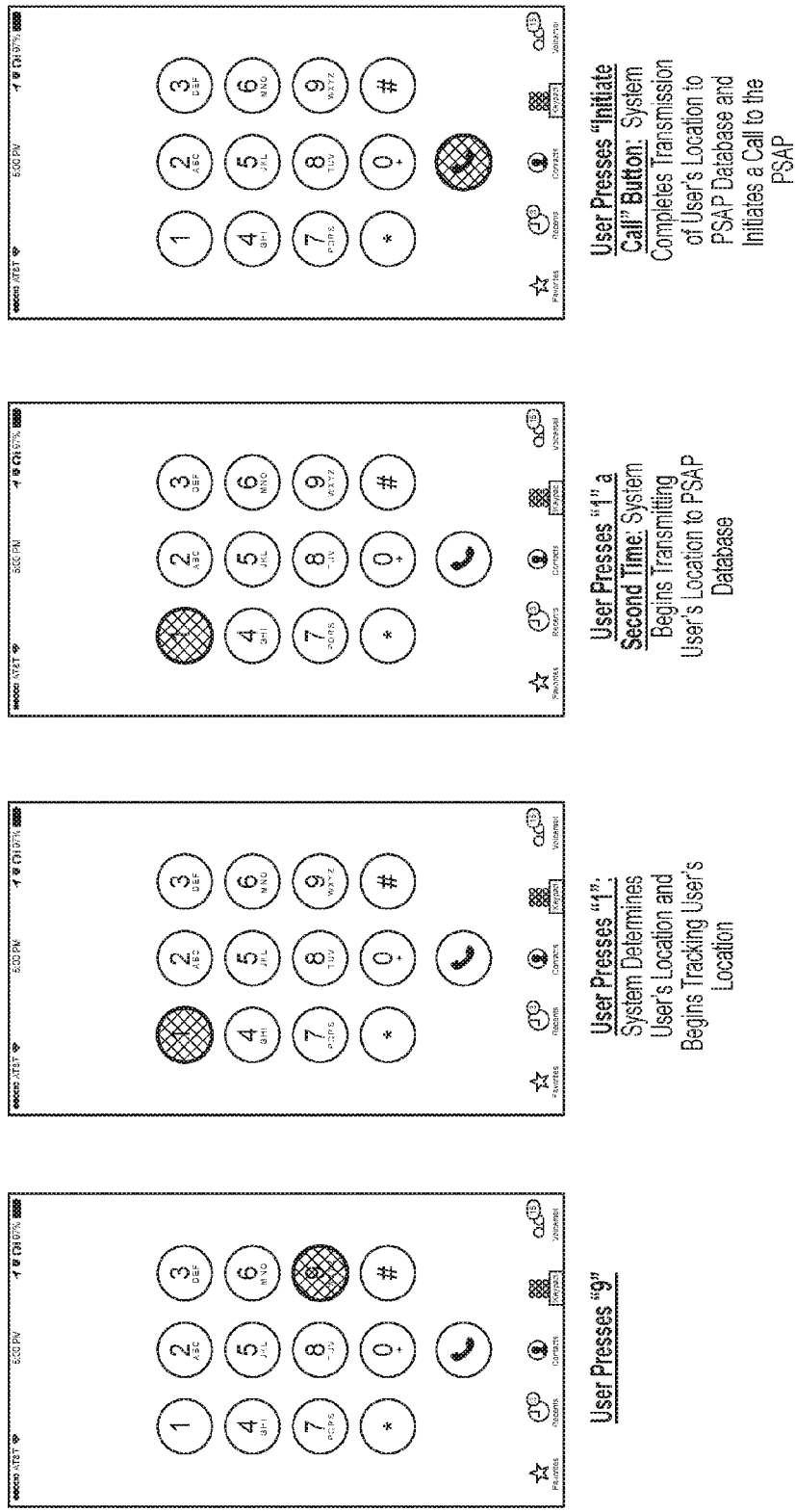
FIG. 12 is a third sequence of screen shots from a user dialing interface of a portable computing device, where selected numbers that are selected by a user are shown hatched.

In particular variations of the example of FIG. 11, the system may transmit, and/or begin to transmit, the user's location to the database that will be handling a request for emergency services from the user in response to the occurrence of any of the four steps shown in FIG. 11. A particular example of this is shown in FIG. 12, which shows a call-dialing graphical user interface on a user's portable computing device (e.g., smartphone, tablet computer, laptop computer, etc.). As shown in this figure, proceeding from left to right, the user first dials "9". In response to the user dialing "9", the system takes no action. Next, the user dials "1" and, in response, the system determines the user's location and begins tracking the user's location. Next, the user dials "1" a second time and, in response, the system begins transmitting the user's location (e.g., in data packets via an appropriate computer network) to a database that will be accessed by a PSAP that will be handling the request for emergency services from the user (e.g., the PSAP that has been assigned to handle emergency calls from the user's current and/or determined location). Finally, the user selects the "initiate call" button and, in response, the system completes the transmission of the user's location to the database and initiates the request for emergency services to the PSAP. In a variation of the above, the system may complete the transmission of the user's location to the PSAP database before the user selects the "Initiate Call" button.

In various embodiments, the system may follow a somewhat simplified version of the approaches outlined above. In such embodiments, in response to determining that a user has dialed a particular emergency phone number on their mobile computing device, but has not executed the request for emergency services (e.g., by pressing an "initiate call" button), the system may initiate monitoring of the individual's location. Also, in various embodiments, in response to determining that a user has modified an entered sequence of alphanumeric characters so that it is no longer an emergency phone number (e.g., the user has deleted the last number in "911" to make the currently entered number "91", or the user has added an additional number to "911" to make the currently entered number "9118", the system may stop monitoring the individual's location in order to save system resources (e.g., the battery life of the user's portable device).

It should be understood that, while the examples above are discussed above, in various examples, in regard to a user's dialing of a particular emergency phone number, similar techniques may be used in the context of a user dialing other predetermined sequences of alphanumeric characters to request emergency assistance, or in the context of a user requesting emergency assistance by taking any other suitable action (e.g., requesting emergency assistance within the context of an "app" on a mobile computing device, such as a tablet, smartphone, virtual personal assistant, or wearable device that has computing capabilities (e.g., fitness tracker, watch, eyeglasses, etc.)).

CONCLUSION

Many modifications and other embodiments of the invention will come to mind to one skilled in the art to which this invention pertains, having the benefit of the teaching presented in the foregoing descriptions and the associated drawings. Therefore, it is to be understood that the invention is not to be limited to the specific embodiments disclosed and that modifications and other embodiments are intended to be included within the scope of the appended claims. It should also be specifically understood that any steps executed within a set of computer-executable instructions would, at least in various embodiments, be executed by at least one computer processor associated with memory.

Also, although various embodiments are described above as using a smartphone or tablet as the "portable computing device" used in various embodiments, it should be understood that other portable computing devices (e.g., portable computerized devices that fall within the "Internet of Things"—e.g., computerized cars, shoes, pens, suitcases etc.) may also be used in the context of certain embodiments. It should also be understood that, in particular embodiments, non-portable computing devices, such as ATM machines, non-portable household appliances and desktop computers, may also be used in place of one or more of the portable computing devices described above.

Also, in any of the embodiments described herein in which the user's location is being described as being determined on a particular computing device, it should be understood that that determination could be made by any other suitable computing device inside or outside of the system. For example, rather than having a computer that is remote from the user's mobile device determine the user's location, the user's mobile device may make this determination. Similarly, in embodiments where the user's location is described as being made by the user's mobile computing device, it should be understood that that determination could be made by a remote computer instead. Further, it should be understood that any series of actions undertaken by the user to initiate a request for emergency services referenced as "dial" or "dialing" may also refer to other, substitute, actions such as pressing a physical button a prescribed number of times or other sequence (e.g. pressing a physical button for a prescribed period of time).

Also, although various embodiments are described herein as being implemented in the context of an emergency call, it should be understood that, to the extent possible, the various embodiments may also be implemented within the context of other emergency electronic communications, such as the transmission of an emergency SMS message or the transmission of a prerecorded or computer generated spoken message.

Although specific terms are employed herein, they are used in a generic and descriptive sense only and not for the purposes of limitation.

We claim:

1. A computer-implemented method of facilitating determining the location of an individual in the context of the individual using a mobile computing device to initiate an electronic request for emergency services, the method comprising:

receiving, by one or more computer processors, an indication that the individual has taken a set of one or more particular actions to begin a process of initiating the electronic request for emergency services, but has not yet initiated the request;

at least partially in response to receiving the indication, transmitting, by one or more computer processors, telemetry data from the mobile computing device to one or more computers that are remote from the mobile computing device for use in determining, by one or more computer processors, the individual's current location;

receiving, by one or more computer processors, the request from the individual to initiate the electronic request for emergency services;

at least partially in response to receiving the request:

(A) facilitating, by one or more computer processors, a transmission of the individual's determined location to a data structure that a public-safety answering point, that will handle the request for emergency services, will access to determine a dispatchable location for the individual; and (B) initiating, by one or more computer processors, an electronic communication to the public-safety answering point.

2. The computer-implemented method of claim 1, wherein:

the electronic communication is an emergency call; and
the set of one or more particular actions comprises dialing at least a portion of a predetermined emergency number without initiating an emergency call.

3. The computer-implemented method of claim 2, wherein the set of one or more particular actions consists of dialing a portion of the predetermined emergency number that consists of a two first digits of the predetermined emergency number.

4. The computer-implemented method of claim 2, wherein the set of one or more particular actions comprises dialing a predetermined emergency number without initiating an emergency call.

5. The computer-implemented method of claim 4, wherein the predetermined emergency number is a predetermined three-digit number.

6. The computer-implemented method of claim 5, wherein the predetermined emergency number is a number selected from a group consisting of: 911, 000, 999, and 112.

7. The computer-implemented method of claim 1, wherein the step of facilitating the transmission of the individual's determined location to the public-safety answering point comprises:

using the individual's determined location to determine which particular public-safety answering point of a plurality of public-safety answering points should, according to one or more controlling rules or regulations, handle the request for emergency services; and
transmitting the individual's determined location to a data structure that the particular public-safety answering point will access to determine a dispatchable location for the individual.

8. The computer-implemented method of claim 1, wherein:

the step of transmitting telemetry data is done at least partially in response to receiving the indication; and
the step of transmitting telemetry data is initiated before the step of initiating the electronic communication.

9. The computer-implemented method of claim 8, wherein:

the electronic communication is an emergency call; and
the set of one or more particular actions comprises dialing at least a portion of a predetermined emergency number.

10. The computer-implemented method of claim 9, wherein the set of one or more particular actions consists of dialing a first two digits of a predetermined emergency number.

11. The computer-implemented method of claim 10, wherein the set of one or more particular actions consists of dialing "91".

12. The computer-implemented method of claim 9, wherein the set of one or more particular actions consists of dialing a first three digits of a predetermined emergency number.

13. The computer-implemented method of claim 1, wherein the set of one or more particular actions comprises selecting an area of a display screen of the mobile computing device that is selectable to initiate an emergency communication.

14. The computer-implemented method of claim 1, wherein the set of one or more particular actions comprises pressing one or more physical or virtual buttons.

15. The computer-implemented method of claim 14, wherein the one or more physical or virtual buttons are located on the mobile computing device.

16. The computer-implemented method of claim 14, wherein the one or more physical or virtual buttons are located on a second computing device that is in communication with the mobile computing device.

17. A computer-implemented method of facilitating determining a location of an individual in the context of the individual using a mobile computing device to place an emergency call, the method comprising:

receiving, by one or more computer processors, a first indication that the individual has used a caller interface of the mobile device to select a first particular digit of an emergency number;

at least partially in response to receiving the first indication, transmitting a first set of telemetry data to one or more remote computers for use in determining the individual's current location;

after receiving the first indication, receiving, by one or more computer processors, a second indication that the individual has used a caller interface of the mobile device to select a second particular digit of the emergency number;

at least partially in response to receiving the second indication, transmitting a second set of telemetry data to the one or more remote computers for use in determining the individual's current location, the second set of telemetry data being different than the first set of telemetry data;

receiving a request, from the user, to initiate the emergency call; and at least partially in response to receiving the request:

(A) facilitating a transmission of the individual's determined location to a particular data structure that a public-safety answering point, that will handle the emergency call, will access to determine a dispatchable location for the individual; and (B) initiating, by one or more computer processors, an emergency call, to the public-safety answering point, regarding an emergency involving the particular individual, wherein:

the individual's determined location is based at least in part on location data selected from a group consisting of: (i) the first set of telemetry data and; (ii) the second set of telemetry data.

18. The computer-implemented method of claim 17, wherein the step of initiating the emergency call is done after the step of transmitting the individual's location to the particular data structure.

19. The computer-implemented method of claim 17, wherein the first particular digit of the emergency number is a second sequential digit in the emergency number.

20. The computer-implemented method of claim 19, wherein the emergency number is 911 and the first particular digit is 1.

21. The computer-implemented method of claim 19, wherein the first particular digit of the emergency number is a third sequential digit in the emergency number.

\* \* \* \* \*